(12) United States Patent
Liu et al.

(10) Patent No.: US 10,455,519 B1
(45) Date of Patent: Oct. 22, 2019

(54) BROADCAST MESSAGE TRANSMISSION

(71) Applicant: International Business Machines Corporation, Armonk, NY (US)

(72) Inventors: Dong Hui Liu, Beijing (CN); Yi Gong, Beijing (CN); Yong Yin, Beijing (CN); Jia Yu, Beijing (CN); Jia Tian Zhong, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/135,052

(22) Filed: Sep. 19, 2018

(51) Int. Cl.
*H04W 4/80* (2018.01)
*H04W 52/24* (2009.01)
*H04B 17/318* (2015.01)
*H04L 29/06* (2006.01)
*H04W 4/02* (2018.01)

(52) U.S. Cl.
CPC ........ *H04W 52/245* (2013.01); *H04B 17/318* (2015.01); *H04L 63/0435* (2013.01); *H04W 4/025* (2013.01); *H04W 4/80* (2018.02)

(58) Field of Classification Search
CPC ..... H04W 52/245; H04W 4/80; H04W 4/025; H04W 72/06; H04B 17/318; H04L 63/0435
USPC ................................ 455/522, 513
See application file for complete search history.

(56) References Cited

U.S. PATENT DOCUMENTS

| | | | | |
|---|---|---|---|---|
| 6,973,335 B2 * | 12/2005 | Ganton | ................. | H04W 52/00 455/573 |
| 7,555,300 B2 * | 6/2009 | Scheinert | ................. | H04W 8/30 455/450 |
| 9,094,407 B1 * | 7/2015 | Matthieu | ................. | H04W 4/70 |
| 9,787,103 B1 * | 10/2017 | Leabman | ................. | H04W 4/80 |
| 9,788,257 B2 * | 10/2017 | Singh | ................. | H04W 40/246 |
| 9,825,674 B1 * | 11/2017 | Leabman | ............. | H04B 5/0037 |
| 9,853,458 B1 * | 12/2017 | Bell | ........ | H02J 5/005 |
| 10,122,415 B2 * | 11/2018 | Bell | ..................... | H04B 5/0037 |
| 10,291,294 B2 * | 5/2019 | Leabman | ............. | H04B 5/0037 |

(Continued)

FOREIGN PATENT DOCUMENTS

EP WO0186834 A1 11/2001
EP 3065469 A1 7/2016

OTHER PUBLICATIONS

Libelium, "Bluetooth Low Energy to Connect Sensors with Smartphones and Tablets", http://www.libelium.com/bluetooth-low-energy-ble-4-0-smart-connect-sensors-smartphone/, Apr. 21, 2014.

(Continued)

*Primary Examiner* — Hai V Nguyen
(74) *Attorney, Agent, or Firm* — Michael A. Petrocelli

(57) ABSTRACT

A computer-implemented method includes receiving, by one or more processors on a first device, a first broadcast message from a second device including a wireless-enabled device operating on a Low Energy (LE) advertising channel, the first broadcast message includes transmission power information associated with the second device, transmission data, and a destination address, determining, by the one or more processors, a Received Signal Strength Indication (RSSI) of the first device, and based on the determined RSSI of the first device and the transmission power information associated with the second device, sending, by the one or more processors, the transmission data to the destination address.

20 Claims, 7 Drawing Sheets

(56) References Cited

U.S. PATENT DOCUMENTS

| | | | | |
|---|---|---|---|---|
| 2003/0190938 | A1* | 10/2003 | Ganton | H04W 52/00 |
| | | | | 455/574 |
| 2008/0130593 | A1* | 6/2008 | Scheinert | H04W 8/30 |
| | | | | 370/337 |
| 2010/0008293 | A1* | 1/2010 | Gupta | H04W 92/20 |
| | | | | 370/328 |
| 2012/0196534 | A1* | 8/2012 | Kasslin | H04W 76/40 |
| | | | | 455/41.2 |
| 2014/0135042 | A1* | 5/2014 | Buchheim | G01S 1/68 |
| | | | | 455/456.6 |
| 2014/0188348 | A1* | 7/2014 | Gautama et al. | B60W 10/30 |
| | | | | 455/522 |
| 2015/0358234 | A1* | 12/2015 | Krieger | H04W 4/80 |
| | | | | 709/235 |
| 2016/0029149 | A1* | 1/2016 | Morikawa | H04W 76/10 |
| | | | | 455/41.2 |
| 2016/0088424 | A1* | 3/2016 | Polo | H04W 4/80 |
| | | | | 455/41.1 |
| 2016/0174022 | A1* | 6/2016 | Nhu | H04W 4/70 |
| | | | | 455/41.2 |
| 2016/0174266 | A1* | 6/2016 | Goel | H04W 4/70 |
| | | | | 455/509 |
| 2016/0191121 | A1* | 6/2016 | Bell | H04B 5/0037 |
| | | | | 307/104 |
| 2017/0156102 | A1* | 6/2017 | Singh | H04W 40/246 |
| 2017/0235452 | A1* | 8/2017 | Selfridge | G06F 3/0484 |
| | | | | 715/744 |
| 2017/0235453 | A1* | 8/2017 | Selfridge | G06F 3/0484 |
| | | | | 715/741 |
| 2017/0235454 | A1* | 8/2017 | Selfridge | G06F 3/0484 |
| | | | | 715/744 |
| 2017/0372600 | A1* | 12/2017 | Palin | G06F 3/0484 |
| 2018/0072223 | A1* | 3/2018 | Arunachalann | H04W 4/80 |
| 2018/0074156 | A1* | 3/2018 | Arunachalann | H04W 4/80 |
| 2018/0077521 | A1* | 3/2018 | Arunachalann | H04W 4/80 |
| 2018/0077545 | A1* | 3/2018 | Arunachalann | H04W 4/80 |
| 2018/0077546 | A1* | 3/2018 | Arunachalann | H04W 4/80 |
| 2018/0183494 | A1* | 6/2018 | Leabman | H04B 5/0037 |
| 2018/0241255 | A1* | 8/2018 | Leabman | H02J 50/40 |
| 2018/0337534 | A1* | 11/2018 | Bell | H02J 5/005 |
| 2019/0098494 | A1* | 3/2019 | Pry | H04W 12/0013 |
| 2019/0159109 | A1* | 5/2019 | Bloechl | H04W 48/10 |

OTHER PUBLICATIONS

Hussain et al, "SeamBlue: Seamless Low Energy Connection Migration for Unmodified IOT Devices", EWSN '17 Proceedings of the 2017 International Conference on Embedded Wireless Systems and Networks, Feb. 20-22, 2017, pp. 132-143, Uppsala, Sweden.

* cited by examiner

| output power level | P | M |
|---|---|---|
| 0 | -30 dBm | -115 dBm |
| 1 | -20 dBm | -84 dBm |
| 2 | -16 dBm | -81 dBm |
| 3 | -12 dBm | -77 dBm |
| 4 | -8 dBm | -72 dBm |
| 5 | -4 dBm | -69 dBm |
| 6 | 0 dBm | -65 dBm |
| 7 | 4 dBm | -59 dBm |

BROADCAST MESSAGE TRANSMISSION

BACKGROUND

The present disclosure relates to the field of wireless communication, and more specifically, to a method, system and computer program product for wireless transmission of a broadcast message to a destination address.

Bluetooth® communication protocol, which operates in the 2.4 GHz ISM band, is known as a short-range radio network communication protocol. Bluetooth® Low Energy (LE) protocol is a supplement to the Bluetooth® communication protocol directed to optimize power consumption of devices while being connected to other devices.

SUMMARY

Example embodiments of the present disclosure include method, system, and computer program product for wireless transmission of a broadcast message to a destination address.

In an embodiment, a method is disclosed. According to the method, one or more processors on a first device may receive a first broadcast message, which is from a second wireless-enabled device on a Low Energy (LE) advertising channel, where the first broadcast message includes at least transmission power related information of the second device, transmission data, and a destination address. And then the one or more processors may determine Received Signal Strength Indication (RSSI) of the first device. At last, the one or more processors may determine whether to send the transmission data to the destination address based on at least the RSSI and the transmission power related information.

In another embodiment, a computer-implemented system is disclosed. The system may include a computer processor coupled to a computer-readable memory unit, said memory unit including instructions that when executed by the computer processor implements the above method.

In yet another embodiment, a computer program product is disclosed. The computer program product includes a computer readable storage medium having program instructions embodied therewith. When executed on one or more processors, the instructions may cause the one or more processors to perform the above method.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
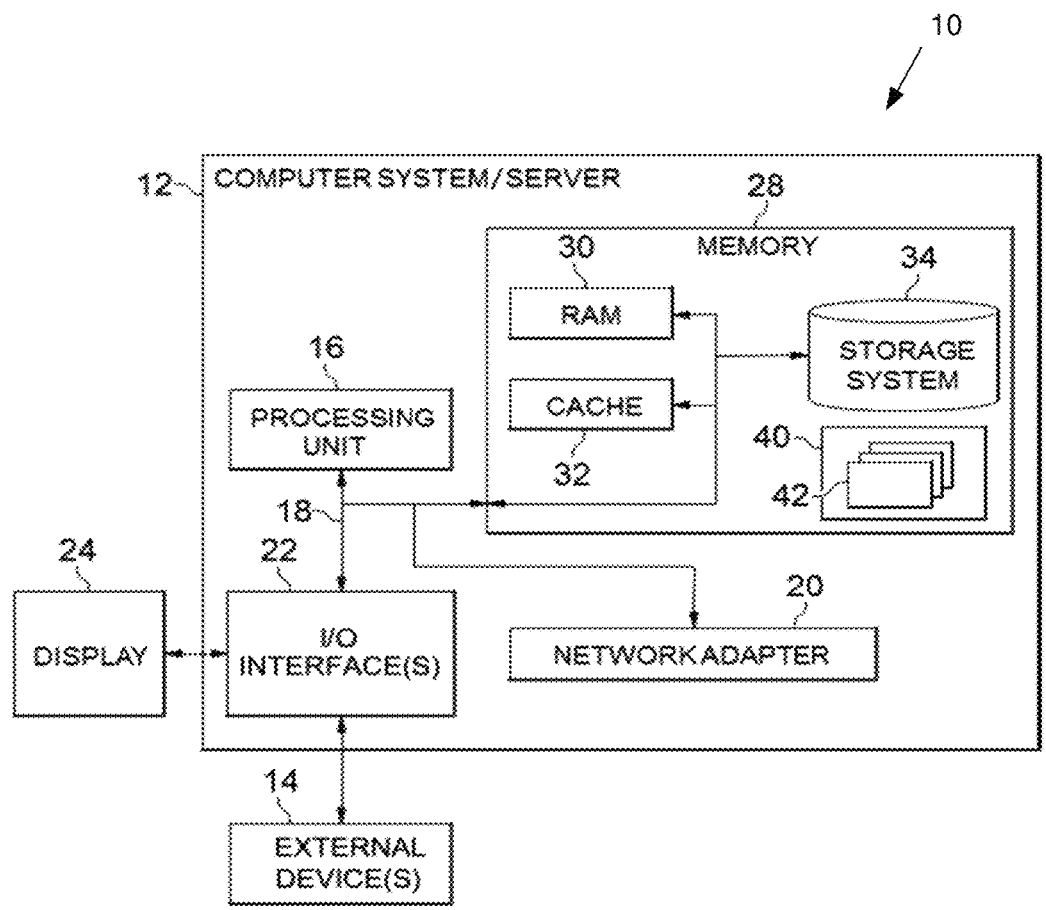
FIG. 1 depicts a cloud computing node, according to an embodiment of the present disclosure.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an exemplary cloud computing node is shown, according to an embodiment of the present disclosure. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
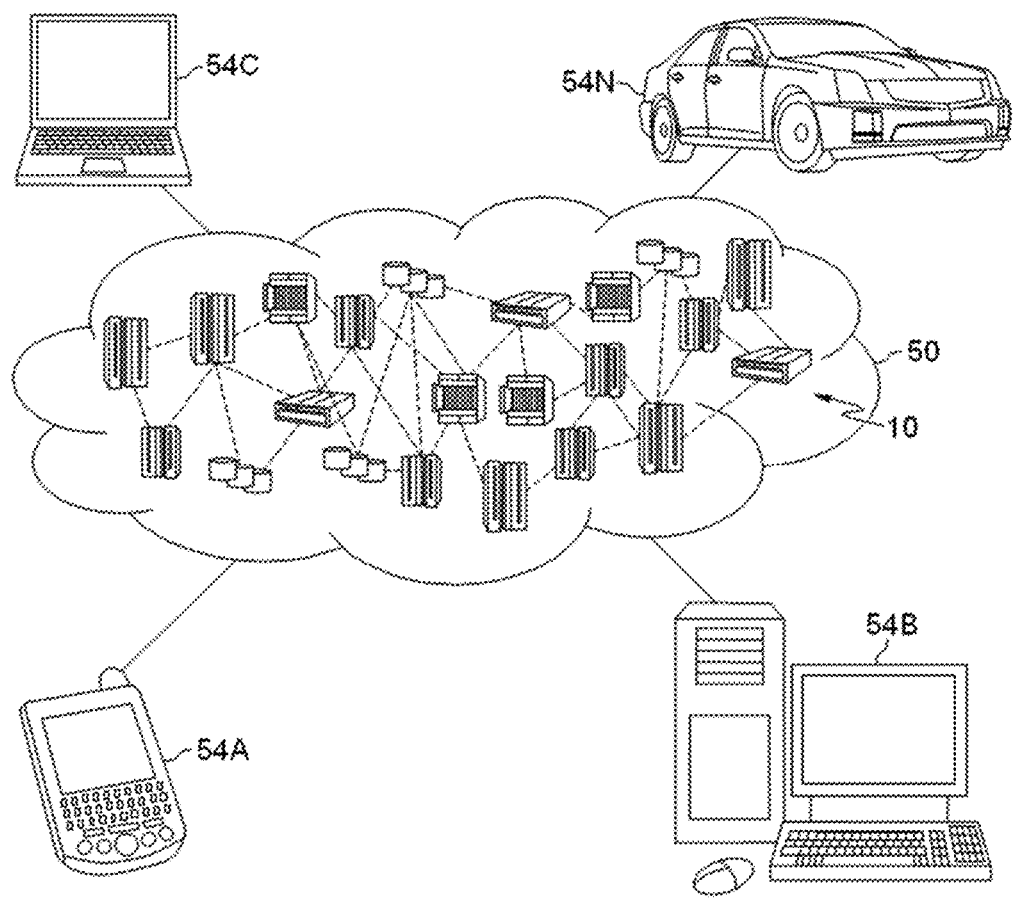
FIG. 2 depicts a cloud computing environment, according to an embodiment of the present disclosure.

Referring now to FIG. 2, an illustrative cloud computing environment 50 is depicted, according to an embodiment of the present disclosure. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
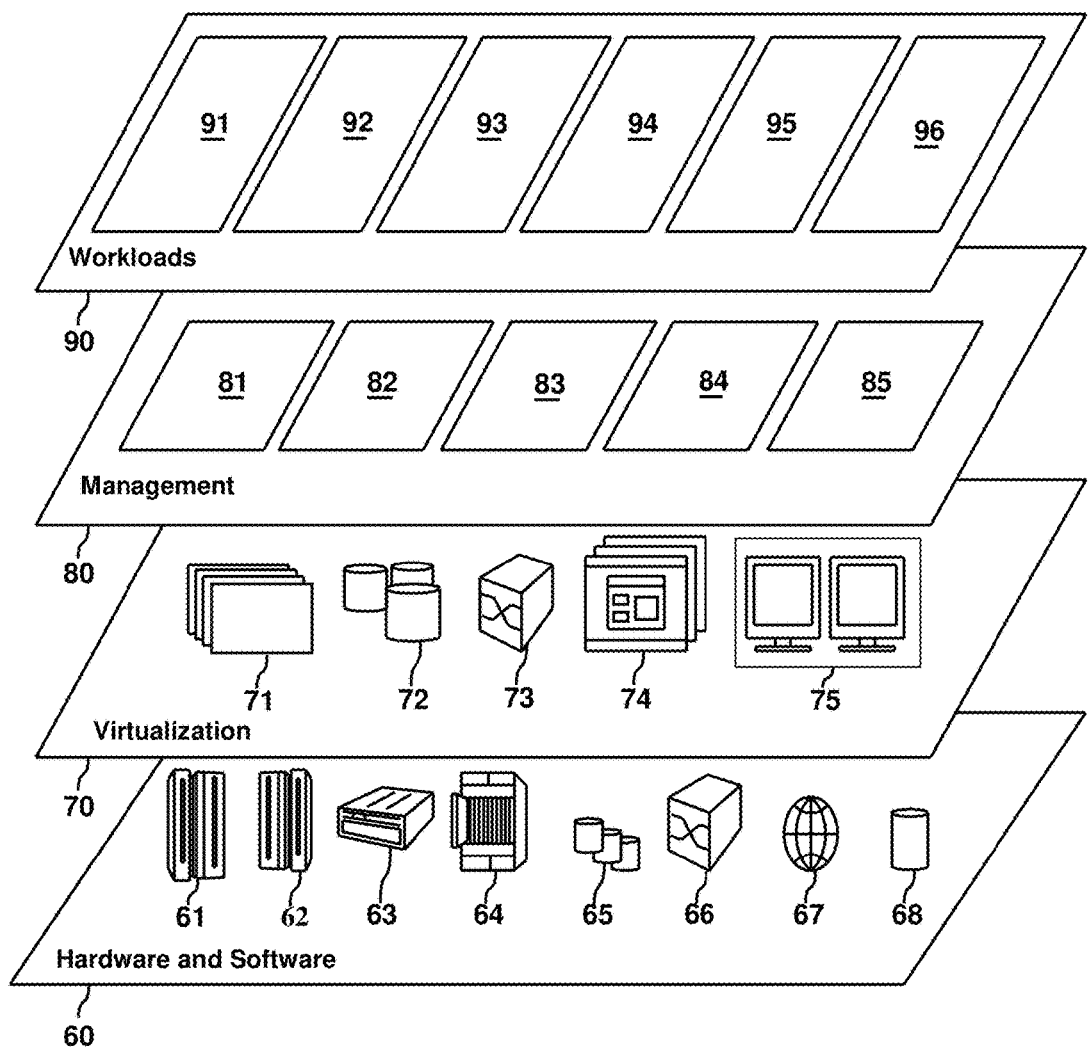
FIG. 3 depicts abstraction model layers, according to an embodiment of the present disclosure.

Referring now to FIG. 3, a set of functional abstraction layers provided by cloud computing environment 50 (FIG. 2) is shown, according to an embodiment of the present disclosure. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and low-energy (LE) wireless broadcast message processing 96.

Low Energy (LE) wireless technology is designed for devices powered by batteries. These types of devices include watches, sports sensors, medical devices and the like. Existing LE wireless technologies include, for example, Bluetooth® LE protocol. The Bluetooth® LE protocol defines some advertising PDUs (protocol Data Unit) similar to a packet that can be received by all Bluetooth® devices in range. These advertising PDUs may carry some application data. For example, a PDU named ADV_IND can carry 31 bytes of application data at most, and a PDU ADV_EXT_IND can carry 255 bytes of application data at most. Low-energy, low-data-rate sensors of Bluetooth® LE, 820.15.4 and Zigbee can only communicate with their paired smartphones with short range radio, thus, data cannot be uploaded when they are disconnected from their paired smartphones (e.g., master devices).

For example, when a wireless-enabled health care device, which is a battery-powered sensor, is used to monitor the physical condition of a patient and transmit the monitored data to the patient's smartphone, the monitored data is transmitted to the patient's smartphone through a LE data channel in order to reduce power consumption of the battery-powered sensor. The monitored data is then transmitted via the patient's smartphone to a destination address associated with a server(s) provided, for example, by a health service provider or a data center hosting the health service provider. The health service provider is an entity indicated by the destination address. In a situation in which the patient does not have access to his/her smartphone and the monitored data indicates the patient is in an emergency, the monitored data cannot be transmitted to the destination address (e.g., health service provider). Such a situation could put at risk the life of the patient.

A potential solution for the above situation includes the battery-operated sensor advertising a tiny amount of data (e.g., monitored data) using a broadcast channel. The data is encrypted with the public key of a designated data center. The advertisements are picked up by strange smartphones around. Then, one or multiple smartphones upload the encrypted data to the data center, and the location information of smartphones is also uploaded. The data center decrypted the data, then forwards the decrypted information and the location information to a paired smartphone of the battery-operated sensor, or an application that utilizes the sensor information.

As such, a safe geographical area can be defined for some kinds of battery-operated sensors, such as locators, to reduce frequency of uploading data. Both the transmission power of battery-operated sensors and smartphones are controlled to reduce broadcast interference. In some cases, the same sensor data may be received by many smartphones. If all smartphones upload data, the data center will be overwhelmed. Therefore, a waiting-broadcasting is designed to enable smartphones to contest, and the smartphones with the largest receiving power of the sensor wins. Only the winner will upload data right away. The losing smartphones of the waiting-broadcasting, cache the packet instead of uploading the packet immediately. Later, these smartphones report only the hash of each packet to the data center. In other cases, the same sensor data may still be sent to a data center by multiple smartphones. Then, the data center selects only the smartphone who has the largest receiving power of the sensor to broadcast a response.

Embodiments of the present disclosure generally relate to the field of wireless communication, and more specifically, to a method, system and computer program product for wireless transmission of a broadcast message to a destination address. Specifically, the following described exemplary embodiments enable battery-operated sensors to upload data when they lost connection with their paired or master device(s). Therefore, the present embodiments have the capacity to improve the technical field of wireless communication by, at a minimum, transmitting a broadcast message from a low-energy wireless-enabled sensor using unpaired (smartphone) devices while controlling transmission power of both the battery-operated sensors and the devices to reduce broadcast interference and energy consumption.

Figures 4A, 4B:
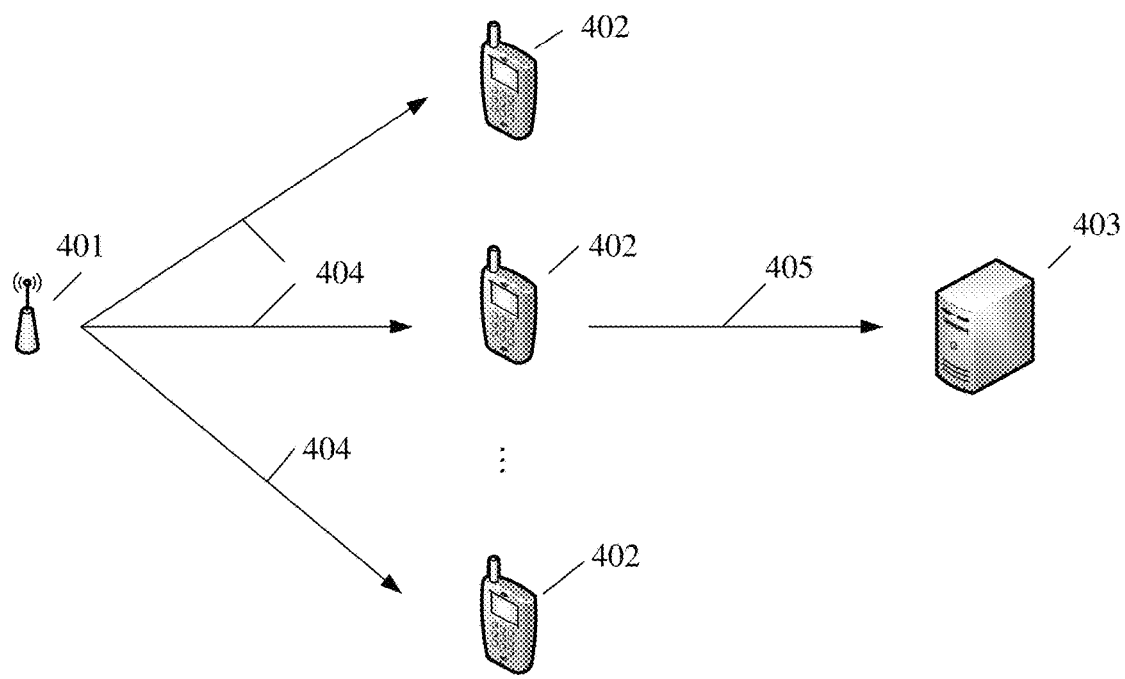
FIG. 4A depicts an exemplary network environment, according to an embodiment of the present disclosure.
FIG. 4B is an example of different transmitter output powers (P) and different transmission power from the transmitter to a place located one (1) meter away in different output power levels of a device, according to an embodiment of the present disclosure.

Referring now to FIG. 4A an exemplary network environment is shown, according to an embodiment of the present disclosure. In this embodiment, a device 401 may be a remote controller, a healthcare monitor, a sports sensor, a token, a key fob, a watch, a wireless keyboard, a gaming pad, a body sensor, a toy, a health care equipment, a human interface device, an entertainment device, a wireless microphone, a GPS sensor, or the like. A plurality of devices (hereinafter "devices") 402 may include, for example, a mobile phone, a PDA, a laptop or a palm top computer, or may be a Bluetooth® enabled stationary access point, an automotive dashboard interface, a home electronics interface or other stationary interface or device capable of wirelessly exchanging data and building personal area networks. According to an embodiment, the device 401 and the devices 402 can operate using a low-energy (LE) wireless protocol such as a Bluetooth® LE protocol. The device 401 sends a (first) broadcast message A (not shown) on a LE advertising channel 404, the LE advertising channel 404 may include, for example, a Bluetooth® advertising channel. The broadcast message A is received by the devices 402. The broadcast message A may be a multicast packet including two parts. A first part of the multicast packet may be a packet header on the physical layer and the link layer which may be defined by the LE wireless protocol. A second part of the multicast packet may be a packet body including information corresponding to transmission power of the device 401, transmission data including, for example, processed monitored data, an ID of the device 401, a time for sending the processed monitored data, etc., and a destination address. In some instances, the destination address is an IP address, or a network address where the transmission data is sent to.

Referring now to FIG. 4B, an example of different transmitter output powers (P) and different transmission power from the transmitter to a place located 1 meter away (M) in different output power levels of the device 401 (provided by a manufacturer of the device 401) is shown, according to an embodiment of the present disclosure. LE wireless protocols, including Bluetooth® LE protocol in Bluetooth® specification 5.0, has defined a transmitter minimum output power of 0.01 mW (−20 dBm) and a maximum output power of 100 mW (+20 dBm). For example, if the device 401 (FIG. 4A) decides to output its power in level 3, its transmission power (P) is −12 dBm, and the transmission power from the transmitter of the device 401 to a place located 1 meter away (M) is −77 dBm. Here, both the −12 dBm and the −77 dBm data can be used as the transmission power associated with the device 401. It should be noted that the output power level of the device 401 may be adjusted according to a current location of the device 401. For example, if the device 401 is located in a less populated area, a bigger output power level can be selected by the device 401. Conversely, a smaller output power level can be selected by the device 401 if located in a densely populated area. In some instances, an owner or user of the device 401 can adjust its output power.

According to an embodiment, the original monitored data can be processed to protect the owner's privacy. For example, the original monitored data may be encrypted with a public key of the entity indicated by the destination address by the device 401 to form the transmission data. The transmission data can be decrypted with the private key of the entity indicated by the destination address at the server side.

According to another embodiment, the device 401 and the entity can negotiate a symmetric key in advance, then the original monitored data may be encrypted with the symmetric key by the device 401 to form the transmission data, and then the transmission data can be decrypted with the symmetric key at the server side.

With continued reference to FIG. 4A, each of the devices 402 is in listen-mode and receives the broadcast message A from the device 401, and then each of the devices 402 may determine a corresponding Received Signal Strength Indication (RSSI). Each of the devices 402 can read its RSSI using command "HCI_Read_RSSI". RSSI is an integer with the unit dBm. It should be noted that for a typical LE wireless device, the RSSI value ranges from approximately −127 dBm to approximately 20 dBm.

As may be understood by those skilled in the art, each of the devices 402 can send the transmission data to the destination address. However, the workload of the server(s) of the entity may be increased if the number of devices 402 is large. In an embodiment, each of the devices 402 can determine whether to send the transmission data to the destination address based on at least the determined RSSI and the received transmission power information, as will be described in detail below. One of the devices 402 may determine that it can send the transmission data to the destination address, so this device 402 may notify the remaining devices 402 by sending a (second) broadcast message B (not shown), and then send the transmission data to the destination address. The remaining devices 402 are still in determining mode when they receive the broadcast message B. Accordingly, by receiving the broadcast message B, the remaining devices 402 know that the transmission data will be sent by another device 402. As such, the remaining devices 402 do not send the transmission data to the destination address, thereby reducing a workload of the entity's server(s).

According to an embodiment, the device 402 sending the transmission data to the destination address may have a positioning capability (such as a GPS positioning or Wi-Fi positioning) that allows including a location of the device 402 in the transmission data being sent to the destination address. Therefore, the final user of the transmission data, i.e. the health service provider in the above example, knows an approximate location of the device 401, and may, for example, send ambulances to the specified location in case of an emergency.

Figure 5:
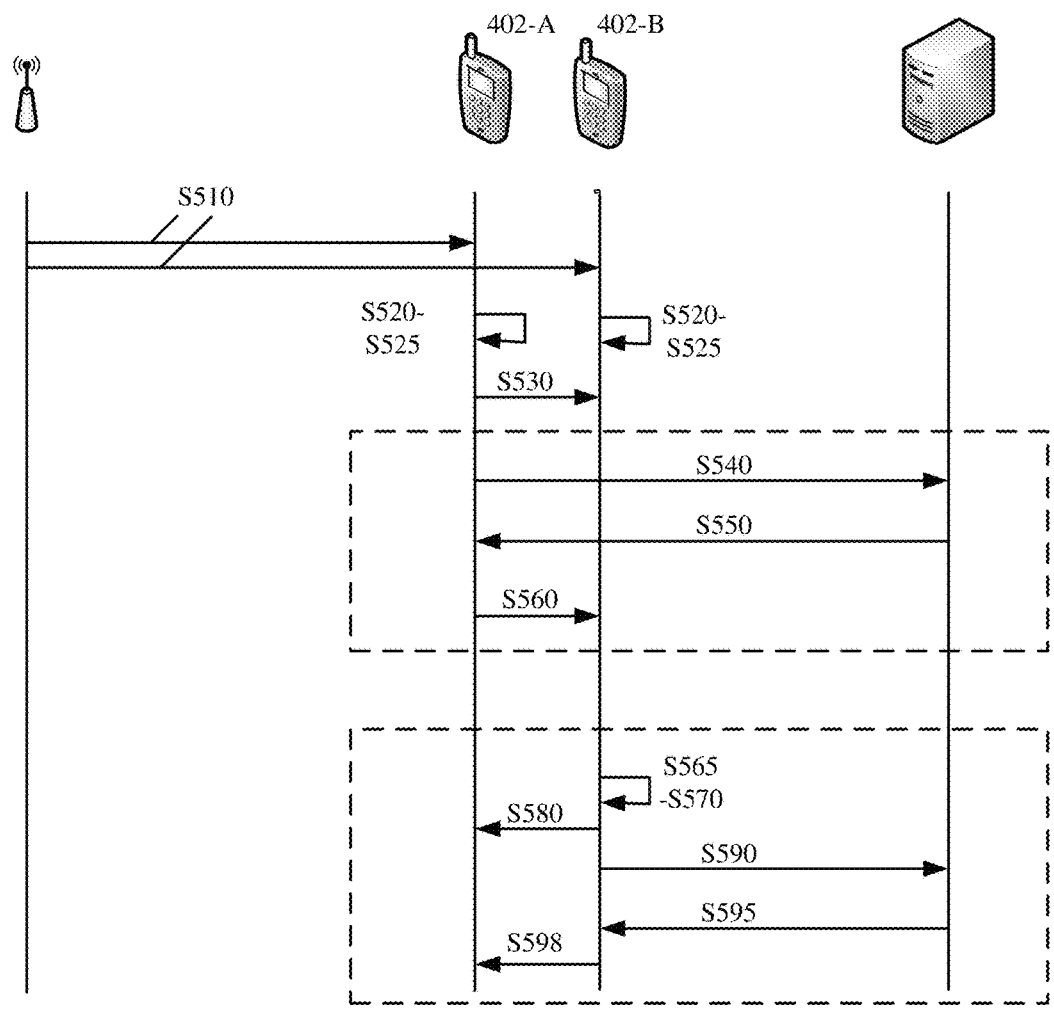
FIG. 5 depicts a flow diagram illustrating a method for wireless transmission of a broadcast message to a destination address, according to an embodiment of the present disclosure.

Referring now to FIG. 5 a flow diagram illustrating a method for wireless transmission of a broadcast message to a destination address is shown, according to an embodiment of the present disclosure. The process begins at step S510 where the device 401 sends the broadcast message A (not shown) on a LE advertising channel. As described above, the broadcast message A is a multicast packet that can be received by both the device 402-A and the device 402-B and includes information corresponding to transmission power of the device 401, transmission data, and a destination address. For illustration purposes only, without intent of limitation, only two devices 402 are shown in FIG. 5, those skilled in the art may understand that it is possible to have more than two devices 402. At step S520, both the device 402-A and the device 402-B determine their respective RSSI. Based on the determined RSSI and the received transmission power information, the device 402-A and the device 402-B, at step S525, independently determine whether the transmission data can be sent to the destination address.

According to an embodiment, each of the devices 402-A, 402-B may set a time for a first timer based on the determined RSSI and the received transmission power information. Then, each of the devices 402-A, 402-B has a corresponding first timer. The first timer of the device 402-A may, for example, be timeout earlier than the first timer of the device 402-B. Once the first timer of the device 402-A is timeout, if it has not received a broadcast message B indicating that the transmission data will be sent to the destination address on the LE advertising channel, the device 402-A may determine that it can send the transmission data. And, at step S530, the device 402-A may send the broadcast message B to the remaining devices 402 (for example, the device 402-B) on the LE advertising channel. The broadcast message B may also be a multicast packet including two parts, similar to the broadcast message A described above. A first part may include a packet header on the physical layer and the link layer which may be defined by a LE wireless protocol such as, for example, the Bluetooth® LE wireless protocol. A second part may be a packet body which includes an indicator indicating that the transmission data will be sent to the destination address. Optionally, the packet body may also include the ID of the device 401, the time at which the broadcast message A is sent, an ID of the device 402-A, the time at which the broadcast message B is sent, and the like. The remaining devices 402 (e.g., the device 402-B) may know that a specific device 402, in this case the device 402-A, sent the transmission data to the destination address. Then, at step S540, the device 402-A sends the transmission data to the destination address via an IP network or any other communication channel predefined by the two parties. At step S550, a notification indicating that the transmission data has been successfully received is sent from the destination address via an IP network or any other communication channel predefined by the two parties. At step S560, the device 402-A may send a (third) broadcast message C to the device 402-B and, if applicable, to other remaining devices 402 on the LE advertising channel. The broadcast message C, which may also be a multicast packet, includes two parts. A first part may include a packet header on the physical layer and the link layer which may be defined by a LE wireless protocol such as, for example, the Bluetooth® LE protocol. A second part may be a packet body including an indicator indicating that the transmission data has been successfully received. Optionally, the packet body may also include the ID of device 401, the time at which the broadcast message A is sent, the ID of the device 402-A, the time at which the broadcast message C is sent, and the like. Accordingly, the device 402-B (and any other remaining device 402) know the transmission data has been successfully received.

With continued reference to FIG. 5, the device 402-B, and any other remaining device 402, may receive the broadcast message B before its associated first timer is timeout. For example, by receiving the broadcast message B, the device 402-B knows that the device 402-A has sent the transmission data before the first timer of the device 402-B is timeout. Then, the device 402-B may cache the broadcast message A, stop its first timer, and start a (new) second timer at step S565. At step S570, the device 402-B may determine whether the device 402-B receives the broadcast message C before the second timer of the device 402-B is timeout. In other words, the device 402-B waits, at step S570, for a successful notification of the transmission data being successfully received. It should be noted that in embodiments in which more than two devices 402 exist, second timers for each device 402, including device 402-B, may be set differently. At step S580, based on the time set by the second timer of the device 402-B being shorter than the time set by the second timer of the remaining devices 402, if the device 402-B determines that it has not received the broadcast message C by the time that the second timer of the device 402-B is timeout, the device 402-B may assume that the specific device (i.e. the device 402-A) has problems communicating with the destination address and the transmission data has not been received by the destination address. Accordingly, the device 402-B may send the broadcast message B to the remaining devices 402 at step S580 to notify that it will send the transmission data to the destination address. Subsequently, the device 402-B sends the cached transmission data to the destination address at step S590. Upon receiving the notification indicating that the transmission data has been successfully received by the destination address at step S595, the device 402-B may send the broadcast message C to the remaining devices 402, including the device 402-A, at step S598 to notify that the transmission data has been successfully received by the destination address.

According to an embodiment, the devices 402-A, 402-B may set a time T1 for their first timer, where T1 is a function of the transmission power information including, for example, the transmission power information (P) of the device 401 and the RSSI (S) of the devices 402-A, 402-B. The relationship among T1, P and S follows the principle that the smaller P is, the smaller T1 is, and the larger S is, the smaller T1 is. As such, the devices 402 (e.g., 402-A or 402-B) with the smallest P and the largest S has the smallest T1 (indicating it is the closest device 402 to the device 401) and may capture the right to transmit the transmission data to the destination address.

In an embodiment, T1 can be calculated by the following function:

$$T1 = t_0(P-S)$$

where P is the transmission power in dBm of the device 401 and S is the RSSI of the device 402 (e.g., 402-A, 402-B), and t0 is a predefined time constant.

According to another embodiment, the devices 402 may first directly determine a rough distance (d) between the device 401 and the devices 402 based on at least the transmission power of the device 401 from the transmitter of device 401 to a place 1 meter away (M) and the RSSI(S) of the devices 402, then determine the time T1 based on the distance (d). The following provides an exemplary function to compute d:

$$d = 10^{\frac{M-S}{10n}}$$

where M is the transmission power of the device 401 from the transmitter of device 401 to a place 1 meter away and S is the RSSI of the devices 402, and n is a path-loss exponent of the transmission path, which is a constant and may be predefined or sent by the device 401 in the broadcast message A by the device 401. The time T1 can be a linear or nonlinear function of d, and the smaller d is, the smaller T1 is.

Then, the devices 402 can set a time T2 for a second timer by adding the computed time T1 to a predefined time T.

As may be understood by those skilled in the art, times T1 and T2 can be set in different ways, and the first and second timers of the devices 402 can be the same timer with different times T1 and T2.

Figure 6A:
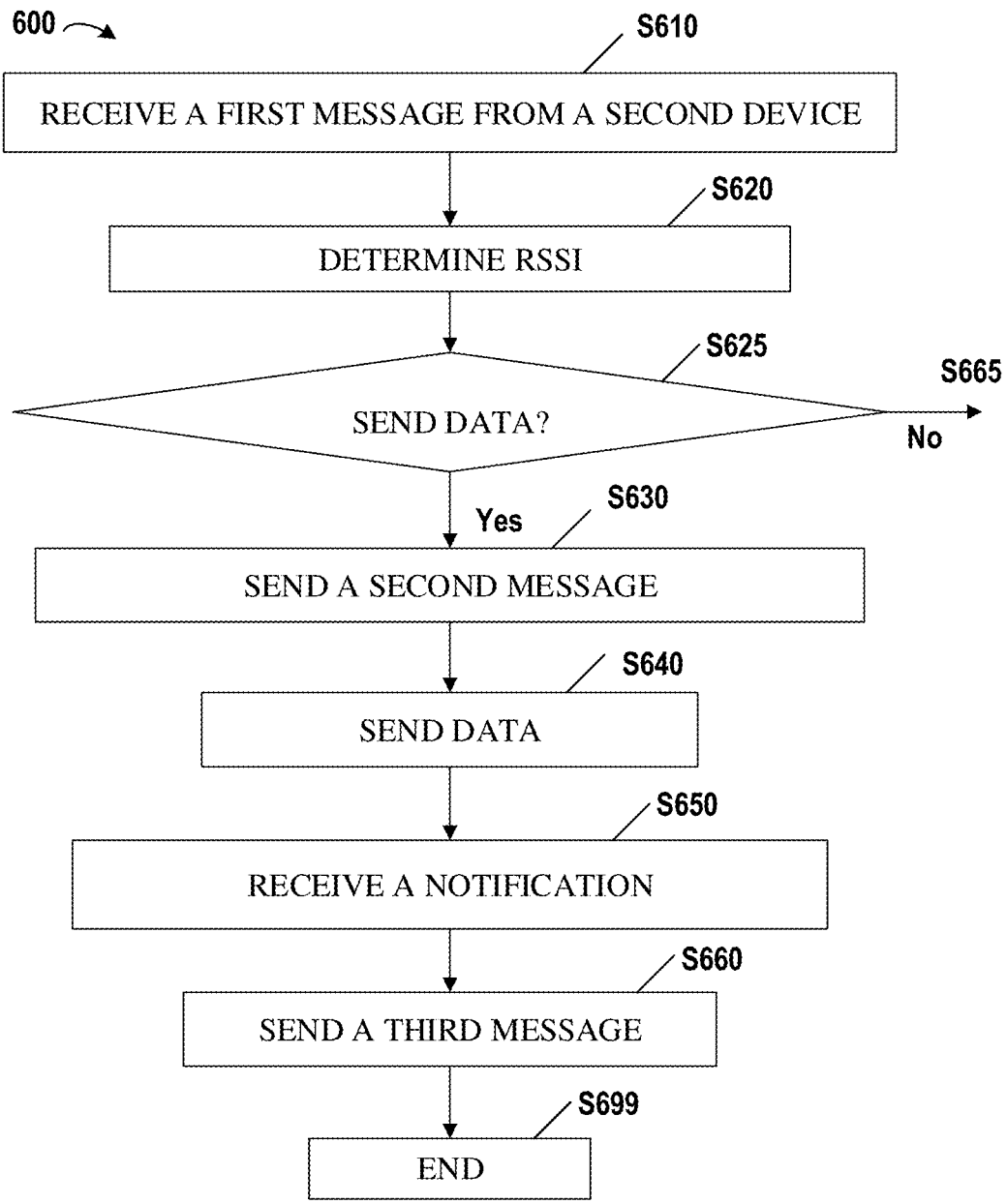
FIGS. 6A-6B depict a flowchart illustrating a method for wireless transmission of a broadcast message to a destination address, according to an embodiment of the present disclosure.
Figure 6B:
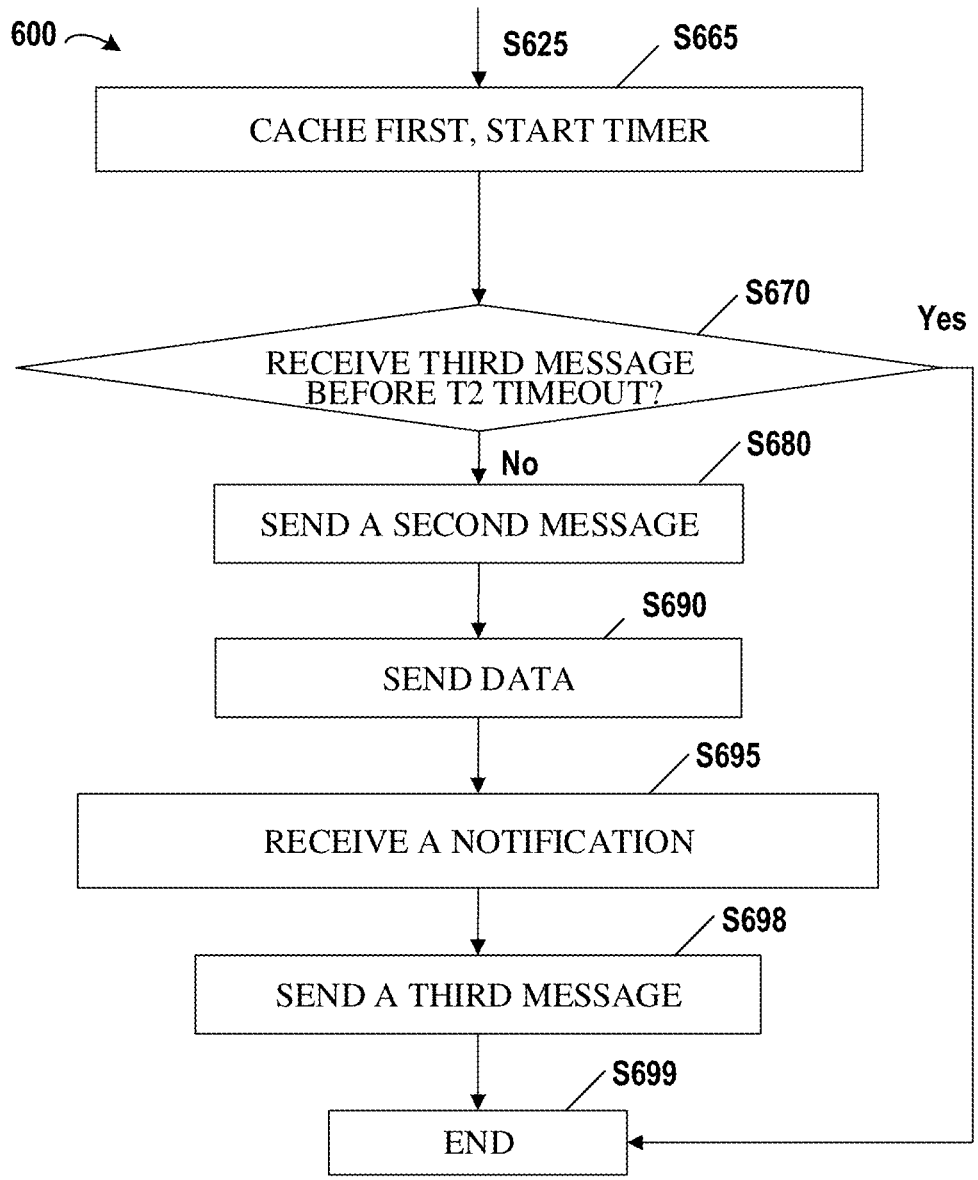

Referring now to FIG. 6A and FIG. 6B, a flow diagram illustrating a method for wireless transmission of a broadcast message to a destination address via a wireless-enabled device is shown, according to an embodiment of the present disclosure. With reference to FIG. 6A, the process 600 begins at step S610 in which one or more processors on the device 402 may receive the broadcast message A on a LE advertising channel, and the broadcast message A, which may be an multicast packet, includes the transmission power information associated with the device 401, the transmission data, and the destination address. At step S620, the one or more processors on the device 402 may determine its own RSSI, and then at step S625, the one or more processors on the device 402 can determine whether to send the transmission data to the destination address based on at least the determined RSSI and the received transmission power information.

In an exemplary embodiment, if the one or more processors on the device 402 send the transmission data to the destination address, at step S630, one or more processors on the device 402 may send the broadcast message B on the LE advertising channel to indicate that the transmission data would be sent to the destination address. Then, at step S640, one or more processors on the device 402 may send the transmission data to the destination address via an IP network or any other communication channel predefined by the two parties. At step S650, the one or more processors on the device 402 may receive a notification indicating that the transmission data has been successfully received from the destination address via the IP network or any other communication channel predefined by the two parties. At step S660, the one or more processors on the device 402 may send the broadcast message C to indicate that the transmission data has been successfully received by the destination address.

If the one or more processors on the device 402 receive the broadcast message B, one or more processors on the device 402 may determine not to send the transmission data to the destination address at step S625, as shown in FIG. 6B. Then, the one or more processors on the device 402 may cache the broadcast message A, stop its first timer and start a second timer at step S665. At step S670, the one or more processors on the device 402 may determine whether it has received the broadcast message C by the time that its second timer is timeout. If the one or more processors on the device 402 determine that it has not received the broadcast message C by the time that its second timer is timeout at step S670, the one or more processors on the device 402, may send the broadcast message B on a LE advertising channel at step S680. The cached transmission data is sent to the destination address at step S690. At step S695, the one or more processors on the device 402 may receive, from the destination address, a notification indicating that the transmission data has been successfully received by the destination address. Then, the one or more processors on the device 402 may send the broadcast message C on a LE advertising channel at step S698. The process ends at step S699. If the one or more processors on the device 402 determine that it has received the broadcast message C by the time that its second timer is timeout at step S670, the process is ended at step S699.

As may be understood by those skilled in the art, if a wired LE enabled Access Point (AP) is used as the device 402 and the AP may connect the server(s) of the entity indicated by the destination address via a reliable network, the one or more processors on the device 402 may not execute step S650 and step S660, and also may not make a further determination on steps S665-S698.

Therefore, embodiments of the present disclosure allows a broadcast message from a LE wireless-enabled sensor to be transmitted to its intended destination address via an unpaired mobile phone (e.g., smartphone), and reduce the workload of the server(s) of the entity indicated by the destination address.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for wireless transmission of a broadcast message to a destination address, the computer-implemented method comprising:
   receiving, by one or more processors on a first device, a first broadcast message from a second device comprising a wireless-enabled device operating on a Low Energy (LE) advertising channel, wherein the first broadcast message comprises transmission power information associated with the second device, transmission data, and the destination address;
   determining, by the one or more processors, a Received Signal Strength Indication (RSSI) of the first device; and
   based on the determined RSSI of the first device and the transmission power information associated with the second device, sending, by the one or more processors, the transmission data to the destination address.

2. The method of claim 1, wherein sending the transmission data to the destination address further comprises:
   determining, by the one or more processors, a time of a first timer corresponding to the first device based on the RSSI and the transmission power information;
   starting, by the one or more processors, the first timer;
   in response to the transmission data not being sent to the destination address on the LE advertising channel by the time the first timer is timeout, sending, by the one or more processors, a second broadcast message indicating that the transmission data would be sent to the destination address on the LE advertising channel; and
   sending, by the one or more processors, the transmission data to the destination address.

3. The method of claim 2, wherein determining the time of the first timer corresponding to the first device based on the RSSI and the transmission power information comprises:
   determining, by the one or more processors, a distance between the first device and the second device based on the RSSI and the transmission power information;
   determining, by the one or more processors, the time of the first timer based on the determined distance.

4. The method of claim 2, further comprising:
   in response to the transmission data being successfully received by the destination address, sending, by the one or more processors, a third broadcast message on the LE advertising channel indicating that the transmission data has been successfully received by the destination address.

5. The method of claim 2, wherein sending the transmission data to the destination address based on the RSSI and the transmission power information further comprises:
   in response to receiving the second broadcast message before the first timer is timeout, caching, by the one or more processors, the first broadcast message; and
   starting, by the one or more processors, a second timer corresponding to the first device.

6. The method of claim 5, the method further comprising:
   in response to receiving the second broadcast message and not receiving the third broadcast message by the time the second timer is timeout, sending, by the one or more processors, the second broadcast message; and
   sending, by the one or more processors, the transmission data to the destination address.

7. The method of claim 1, wherein the first device comprises positioning capabilities that allow including a location of the first device in the transmission data.

8. The method of claim 1, wherein the transmission data is encrypted with a public key of an entity indicated by the destination address and decrypted with a private key of the entity.

9. The method of claim 8, further comprising:
   negotiating a symmetric key between the first device and the entity, wherein the transmission data is encrypted by the first device using the symmetric key and decrypted by the entity using the symmetric key.

10. The method of claim 1, wherein the first broadcast message comprises a multicast packet including a packet header and a packet body, the packet body comprising information corresponding to transmission power of the first device.

11. A computer system for wireless transmission of a broadcast message to a destination address, the computer system comprising:
    one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
    receiving, by one or more processors on a first device, a first broadcast message from a second device comprising a wireless-enabled device operating on a Low Energy (LE) advertising channel, wherein the first broadcast message comprises transmission power information associated with the second device, transmission data, and the destination address;
    determining, by the one or more processors, a Received Signal Strength Indication (RSSI) of the first device; and
    based on the determined RSSI of the first device and the transmission power information associated with the second device, sending, by the one or more processors, the transmission data to the destination address.

12. The computer system of claim 11, wherein sending the transmission data to the destination address further comprises:
    determining, by the one or more processors, a time of a first timer corresponding to the first device based on the RSSI and the transmission power information;
    starting, by the one or more processors, the first timer;
    in response to the transmission data not being sent to the destination address on the LE advertising channel by the time the first timer is timeout, sending, by the one or more processors, a second broadcast message indicating that the transmission data would be sent to the destination address on the LE advertising channel; and
    sending, by the one or more processors, the transmission data to the destination address.

13. The computer system of claim 12, wherein determining the time of the first timer corresponding to the first device based on the RSSI and the transmission power information comprises:
    determining, by the one or more processors, a distance between the first device and the second device based on the RSSI and the transmission power information;
    determining, by the one or more processors, the time of the first timer based on the determined distance.

14. The computer system of claim 12, further comprising:
    in response to the transmission data being successfully received by the destination address, sending, by the one or more processors, a third broadcast message on the LE advertising channel indicating that the transmission data has been successfully received by the destination address.

15. The computer system of claim 12, wherein sending the transmission data to the destination address based on the RSSI and the transmission power information further comprises:
   in response to receiving the second broadcast message before the first timer is timeout, caching, by the one or more processors, the first broadcast message; and
   starting, by the one or more processors, a second timer corresponding to the first device.

16. The computer system of claim 15, the method further comprising:
   in response to receiving the second broadcast message and not receiving the third broadcast message by the time the second timer is timeout, sending, by the one or more processors, the second broadcast message; and
   sending, by the one or more processors, the transmission data to the destination address.

17. The computer system of claim 11, wherein the first device comprises positioning capabilities that allow including a location of the first device in the transmission data.

18. The computer system of claim 11, wherein the transmission data is encrypted with a public key of an entity indicated by the destination address and decrypted with a private key of the entity.

19. The computer system of claim 18, further comprising:
   negotiating a symmetric key between the first device and the entity, wherein the transmission data is encrypted by the first device using the symmetric key and decrypted by the entity using the symmetric key.

20. The computer system of claim 11, wherein the first broadcast message comprises a multicast packet including a packet header and a packet body, the packet body comprising information corresponding to transmission power of the first device.

* * * * *